US010735718B2

(12) United States Patent
Kang et al.

(10) Patent No.: US 10,735,718 B2
(45) Date of Patent: Aug. 4, 2020

(54) RESTORING COMPONENTS USING DATA RETRIEVED FROM A PROJECTOR MEMORY

(71) Applicant: Hewlett-Packard Development Company, L.P., Houston, TX (US)

(72) Inventors: Jinman Kang, San Diego, CA (US); Ben Wynne, San Diego, CA (US); Amit A Marathe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 448 days.

(21) Appl. No.: 15/500,657

(22) PCT Filed: Jul. 31, 2014

(86) PCT No.: PCT/US2014/049185
§ 371 (c)(1),
(2) Date: Jan. 31, 2017

(87) PCT Pub. No.: WO2016/018378
PCT Pub. Date: Feb. 4, 2016

(65) Prior Publication Data
US 2017/0223348 A1    Aug. 3, 2017

(51) Int. Cl.
*G06F 3/042*    (2006.01)
*G06F 3/041*    (2006.01)
(Continued)

(52) U.S. Cl.
CPC .......... *H04N 17/004* (2013.01); *G06F 3/0418* (2013.01); *G06F 3/0425* (2013.01);
(Continued)

(58) Field of Classification Search
CPC ............. G06F 17/30303; G06F 3/0418; G06F 3/0425; H04N 9/3191
(Continued)

(56) References Cited

U.S. PATENT DOCUMENTS 7,310,449 B2    12/2007 Kobayashi et al.
7,599,561 B2    10/2009 Wilson et al.
(Continued)

FOREIGN PATENT DOCUMENTS

EP    1555834 A2    7/2005
EP    2590019 A2    5/2013

OTHER PUBLICATIONS

Shahram Izadi et al., "C-Slate: A Multi-Touch and Object Recognition System for Remote Collaboration using Horizontal Surfaces,", 2007, pp. 3-10, IEEE.
(Continued)

*Primary Examiner* — Paulos M Natnael
(74) *Attorney, Agent, or Firm* — Lakshmi Kumaran & Sridharan

(57) ABSTRACT

The present subject matter relates to data storage in a computing system. In an example, the computing system includes a projector unit including a projector memory. The projector memory may store calibration data pertaining to a plurality of components of the computing system in the projector memory. The plurality of components may include the projector unit and a display unit. Further, the calibration data corresponds to information pertaining to calibrations performed during factory calibration of each of the plurality of components.

21 Claims, 5 Drawing Sheets

(51) Int. Cl.
   *H04N 9/31* (2006.01)
   *H04N 17/00* (2006.01)
   *G06F 9/451* (2018.01)
   *H04N 7/18* (2006.01)

(52) U.S. Cl.
   CPC ............ *G06F 9/451* (2018.02); *H04N 7/183* (2013.01); *H04N 9/3179* (2013.01); *H04N 9/3182* (2013.01); *H04N 9/3191* (2013.01); *H04N 9/3194* (2013.01)

(58) Field of Classification Search
   USPC .................... 348/175, 180–181, 187–190
   See application file for complete search history.

(56) References Cited

U.S. PATENT DOCUMENTS

| | | | |
|---|---|---|---|
| 7,710,391 | B2 | 5/2010 | Bell et al. |
| 8,021,003 | B2* | 9/2011 | Yasuda ................ H04N 5/63 353/122 |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 9,519,968 | B2* | 12/2016 | Kang ..................... G06T 7/002 |
| 2002/0105623 | A1* | 8/2002 | Pinhanez ............... G03B 21/28 353/69 |
| 2003/0204857 | A1* | 10/2003 | Dinwiddie ............. H04N 5/44 725/134 |
| 2004/0150835 | A1 | 8/2004 | Frick et al. |
| 2005/0078092 | A1 | 4/2005 | Clapper |
| 2006/0007177 | A1 | 1/2006 | Mclintock |
| 2007/0115397 | A1 | 5/2007 | Bolas et al. |
| 2008/0018591 | A1 | 1/2008 | Pittel et al. |
| 2010/0177283 | A1 | 7/2010 | Tanaka |
| 2011/0025650 | A1 | 2/2011 | Joscelyne |
| 2011/0242054 | A1 | 10/2011 | Tsu |
| 2013/0077236 | A1 | 3/2013 | Becze et al. |
| 2013/0132329 | A1 | 5/2013 | Raghavan |
| 2015/0261792 | A1* | 9/2015 | Attarde ............. G06F 17/30303 707/616 |

OTHER PUBLICATIONS

Wickizer et al, "Panasonic Debuts PT-L701SDU Ultra-portable XGA Projector First Projector with Built-in SD Memory Card Slot," ProjectorCentral News, Jan. 2001, 3 pgs.

Korean Intellectual Property Office, International Search Report and Written Opinion for PCT/US2014/049185 dated Feb. 25, 2015 (11 pages).

* cited by examiner

RESTORING COMPONENTS USING DATA RETRIEVED FROM A PROJECTOR MEMORY

BACKGROUND

Generally, a computing device may be associated with multiple other devices, such as cameras, display units, and audio units. Each of the devices may have corresponding device settings, which may be calibrated with respect to a target setting, such as Red, Green, Blue (RGB) values and white balance. A target setting of a device may be a default setting for the device, and similar devices may be provided with similar target settings. However, different device types may have different target settings. For instance, a display unit may have different target settings as compared to a camera.

BRIEF DESCRIPTION OF DRAWINGS

The detailed description is described with reference to the accompanying figures, in the figures, the left-most digit(s) of a reference number identifies the figure in which the reference number first appears. The same numbers are used throughout the figures to reference like features and components.

DETAILED DESCRIPTION

Figure 1A:
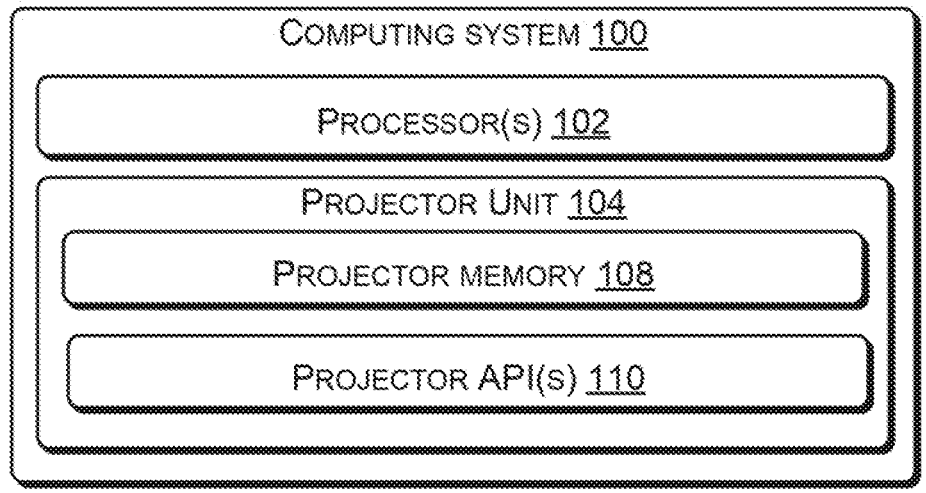
FIGS. 1a and 1b illustrate example computing systems for data storage, in accordance to various examples of the present subject matter.

Generally, a computing system is associated with components, such as a display unit and sensors. Further, the components may be calibrated and configured with respect target settings to be achieved. For instance, device setting of a component may be calibrated with respect to a target setting and, in certain cases; configuration of the component may be performed to further adjust the device settings, for example, based on operating conditions and user preferences. The information pertaining to calibration and configuration of a component may be stored in a memory of the computing system or in the component itself. Calibration information may be used to, restore default settings in case of a failure of the component or the computing system. Further, the restoration of the calibration information and configuration information may be dependent on an operating system of the computing system. For instance, certain operating systems may not allow for storage of the calibration information and/or configuration information. Additionally, in case of a component failure or an operating system failure, the calibration information and the configuration information pertaining to the components may be lost, thereby making data restoration process complicated and cumbersome.

Aspects of the present subject matter relate to storing of device data pertaining to various components of a computing system. The present subject matter provides for operating system independent storage and easy restoration and use of the device data. The device data may relate to data pertaining to calibration or configuration of a component. The device data of a component may provide for proper functioning of the component. The device data, for instance, may correspond to default factory settings of a corresponding component. The calibration data may include information pertaining to calibrations performed with reference to target calibration settings. The configuration data may include information pertaining to further adjustments that may be performed to a component, in addition to the calibration, for better functioning of the component, for instance to enhance quality of images displayed by a component.

In an example, the computing system includes multiple components, such as a plurality of display units, a projector unit, and a sensor cluster unit, which in turn may include an image capturing unit and other sensors. Each of the components may have corresponding device data, which may provide for, for example, restoration of respective default factory settings. In one example, as per the present subject matter, the device data of the various components may be obtained from the corresponding component and may be stored in a projector memory of the projector unit. The projector memory may be, for example, a persistent memory storage device.

The storage of the device data in the projector memory may provide for easy and safe restoration of the calibration information and the configuration information. As the projector memory may be independent of an operating system of the computing system, it may in turn provide for an operating system independent storage and restoration of the device data. Further, as the device data of the components may be stored at a single memory location, it may provide for centralized management of the device data. Additionally, if any component failure is detected or in case an operating system has to be reinstalled, the storage of the device data in, the projector memory may provide for easy restoration of the device data.

The above aspects of the present subject matter and other aspects are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

Examples of how devices and methods for data storage may be implemented are explained in detail with respect to the figures. While aspects of described devices and methods for data storage can be implemented in any number of different devices, environments, and/or implementations, the examples, and implementations are described in the context of the following figure(s).

Figure 1B:
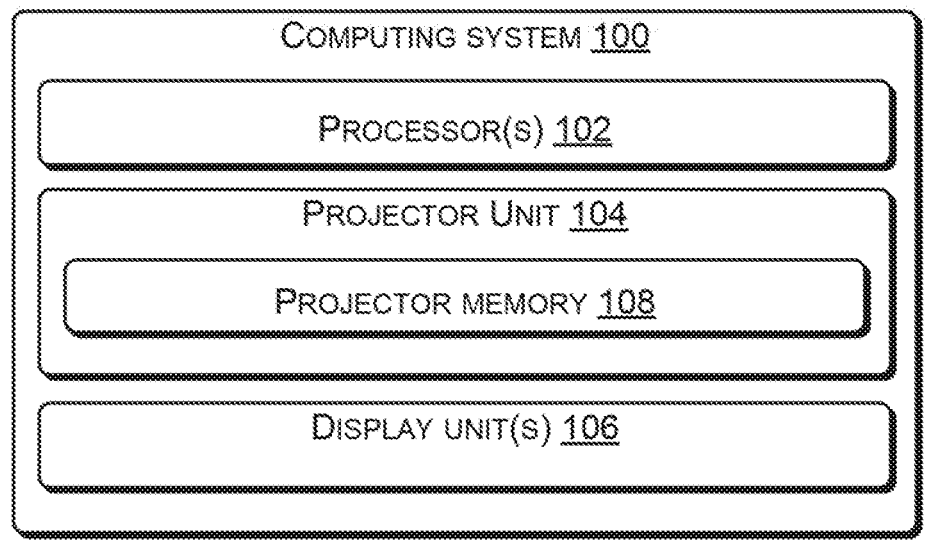

FIGS. 1a and 1b illustrate a computing system 100, according to various examples of the present subject matter. As illustrated, the computing system 100 may include processor(s) 102, a projector unit 104 coupled to the processor 102, and at least one display unit(s) 106 coupled to the processor 102.

The processor 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

In an example, the projector unit 104 may be coupled to at least one of the display units 106. Further, the projector unit 104 includes a projector memory 108 to store device data pertaining to multiple components, such as the projector unit 104 and the display unit 106 of the computing system 100. The device data may include at least one of calibration data and configuration data. Calibration data corresponds to information pertaining to calibrations performed during factory calibration of the components. Configuration data provides information pertaining to device configuration, such as pitch angle, which may further enhance the quality the component, for instance, appropriate device configuration may enhance image quality being displayed by the display unit 106. In an example, projector API(s) 110 of the projector unit 104 may provide for storing of at least the calibration data in the projector memory 108. The storing of data in the projector memory 108 is explained in detail with reference to description of FIG. 2 below.

Figure 2:
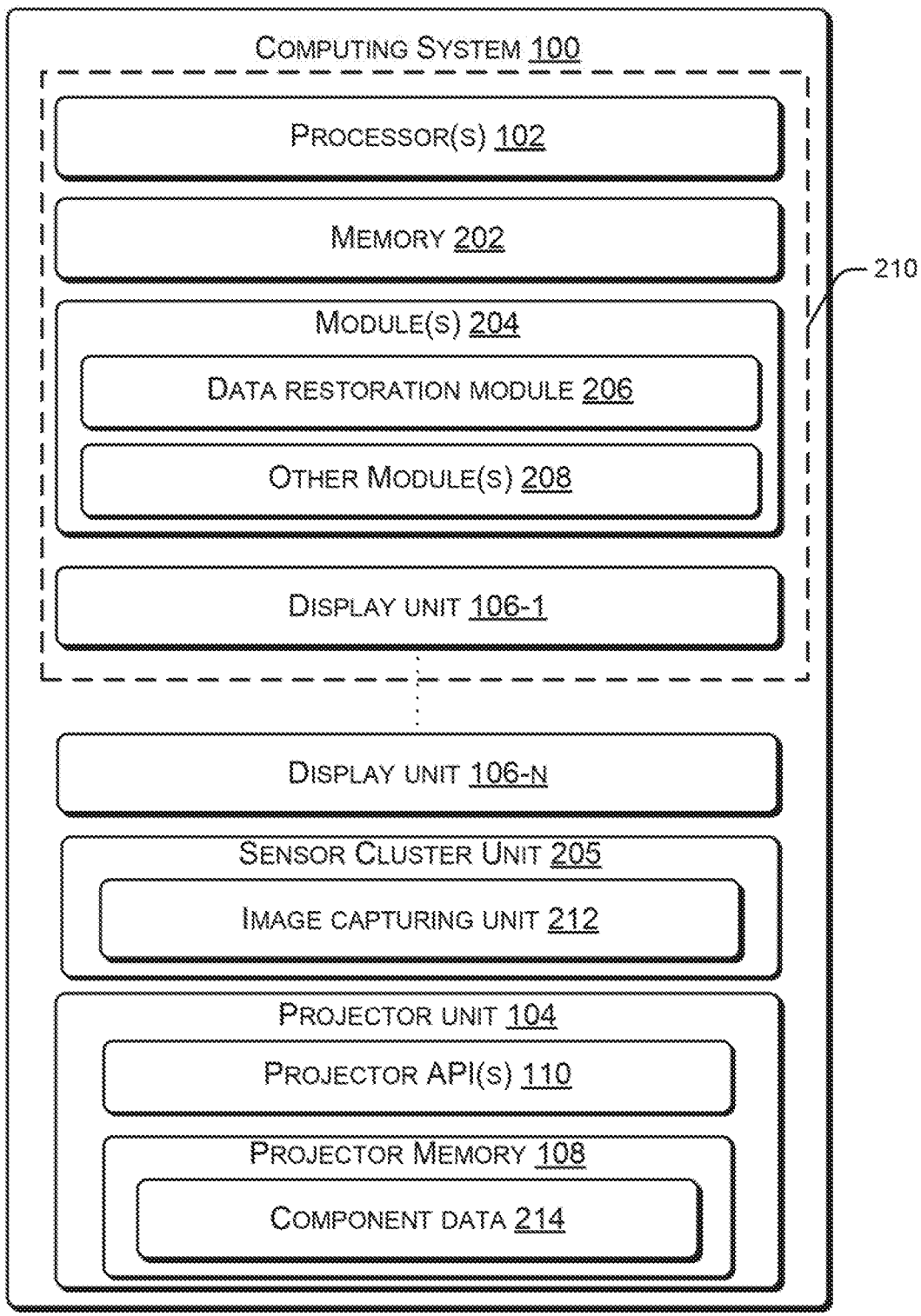
FIG. 2 illustrates various components of an example computing system, in accordance to an example of the present subject matter.

FIG. 2 illustrates various components of the computing system 100, according to an example of the present subject matter. The computing system 100 includes, for instance, the processor(s) 102, memory 202, module(s) 204, the display unit(s) 106-1 . . . 106-N, the projector unit 104, and a sensor cluster unit 205. The display unit(s) 106-1, . . . 106-N may be collectively referred to as display units 106 and individually be referred to as display unit 106.

The memory 202 may be coupled to the processor 102 and may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The modules 204, amongst other things, include routines, programs, objects, components, and data structures, which perform particular tasks or implement particular abstract data types. The modules 204 may also be implemented as, signal processor(s), state machine(s), logic circuitries, and/or any other device or component that manipulate signals based on operational instructions. Further, the modules 204 can be implemented by hardware, by computer-readable instructions executed by a processing unit, or by a combination thereof.

The modules 204 may include a data restoration module 206, and other module(s) 208. The other modules 208 may include programs or coded instructions that supplement applications and functions, for example, programs in an operating system of the computing system 100.

The display unit 106 includes a display surface of the computing system 100. In an example, the display unit 106 may include monitors, liquid crystal display (LCD) screens, and light emitting diode (LED) screens. Additionally, in some examples, the display unit 106 may include touch sensitive technology, for instance, resistive, capacitive, acoustic wave, infrared (IR), strain gauge, optical, acoustic pulse recognition, or any combination thereof.

In an example, the processor 102, the memory 202, the modules 204, and one of the display units 106, such as the display unit 106-1, may form a computing unit 210, such as a smartphone, a tablet, an all-in-one computer, i.e., a computer that has common housing for a display and a processor, or any combination thereof. The computing unit 210 may be integrated with the projector unit 104 and the sensor cluster unit 205 to form the computing system 100. In some examples, the computing unit 210 may also be coupled to additional display unit(s), such as the display unit 106-N. In an example, the display unit 106-1 may function as a display of the computing unit 210, while the display unit 106-N may be provided as an additional display, such as a touch sensitive surface. The additional display unit 106-N may also be communicatively coupled to the processor 102 to perform input/output operations.

Further, images of objects placed on or around the additional display unit 106-N may be captured by a sensor in the sensor cluster unit 205. The sensor cluster unit 205 includes, for example, an image capturing unit 212 and/or other sensors, such as a depth sensor and an infrared (IR) camera sensor. The other sensors may detect, for instance, the location, dimensions, and in some instances, the color of an object to enhance a 2D image or create a 3D scan thereof.

The sensor cluster unit 20 may be coupled to the processor 102 to receive and provide inputs to the processor 102. In an example, the image capturing unit 212 may be, a camera, which may either take a still image or a video of an object and/or document disposed on the display unit 106-N. In another example, the image capturing unit 212 may capture images of other objects in the vicinity. In one example, the image capturing unit 212 and the display units 106 may be aligned along an axis passing through a respective central point.

In an example, the processor 102 may provide for displaying of mages on the display unit 106-N using the projector unit 104. The projector unit 104 may be communicatively coupled to the processor 102 in order to receive data therefrom for producing light and projecting images. The projector unit 104 may be coupled to the processor 102 through an electric conductor, WiFi, Bluetooth®, an optical connection, an ultrasonic connection, or any combination thereof.

The projector unit 104 may include, among other things, a display module (not shown in figures), a flash light unit not shown in figures), the projector APIs 110, and the projector memory 108. The display module may receive the data to be displayed and display the data onto the display unit 106-N. Further, in an example, the flash light unit may function as an illumination source and illuminate surroundings to enable the image capturing unit 212 to capture images. The flash light unit, for instance, may emit light such that the display unit 106-N is illuminated.

The projector components, such as the flash light unit and the display module, may be calibrated during a factory calibration process. The calibration of display module may include projector display alignment, projector color settings, pulse width modulation (PWM) values, and filed of view (FOV) settings, and the calibration of the flash light unit may include calibration of the color settings of the flash light projected by the flash light unit. The information pertaining to calibration of the projector components may be stored in the corresponding calibration data. Likewise, information pertaining to configuration of the projector components may be stored in the configuration data. In one example, the device data including the calibration data and the configuration data is stored in the corresponding component.

Similarly, the sensor cluster unit 205 and, the display units 106 may also be individually calibrated. For instance, the sensors may be calibrated for the FOV settings and geometry calibration parameters, such as feature points and transformation matrix, between sensors in the sensor cluster unit 205. Further, the color settings of the image capturing unit 212 may also be calibrated. Similarly, the color settings of the display units 106 may also be calibrated. The information pertaining to calibration of the sensors in the sensor cluster unit 205 and the display unit 106 may be stored in the calibration data of the component itself. Additionally, configuration related information may be stored in the configuration data of the component. The configuration data may include information pertaining to device configuration of a corresponding component. For instance, width and height of the projector output display, pitch angle of the projector unit 104, x and y offset of the projector unit 104, camera gain of the image capturing unit 212, and exposure settings of the image capturing unit 212. The device data of the sensors in the sensor cluster unit 205 and the display units 106 may be provided in the sensors and the display units 106, respectively.

Further, as discussed above, the various components of the computing system 100 may work in tandem with each other and therefore certain calibrations may also be performed to synchronize the calibration of the components. For example, the color settings of the display unit 106-1, the projector, and the image capturing unit 212 may be calibrated such that an image captured by the image capturing unit 212 and projected by the projector unit 104 appears to be same on the display units 106. Such color settings corresponding to each component may be used as default color settings.

In an example, the device data pertaining to various components may be stored in the projector memory 108 in component data 214. For instance, the device data pertaining to the components that are more likely to fail may be stored in the projector memory 108. In operation, the projector APIs 110 may gather the device data from each component for which device data is to be stored, such as the sensor cluster unit 205, the display units 106, and the projector unit 104. In an example, the projector APIs 110 may be universal serial bus (USB) commands, which may allow for gathering of the device data. Alternatively, a central calibration component (not shown in the figures) of the computing system 100 may provide the device data to the projector API 110. The projector API 110 may perform remote direct memory access (RDMA) operations, such as RDMA read operations and RDMA write operations to write the device data to the projector memory 108. The projector APIs 110 allow for input/output operations without involving computing system's operating system.

In an example, the projector API 110 may perform a predefined data type declaration command, such as struct, allocating a memory block to the device data in the projector memory 108. Further, a caller function, which may be stored in other modules, may parse the predefined data type declaration command to obtain and store the device data in the projector memory 108.

Further; in case the device data is lost, the device data of the various components may be restored using the projector API 110. For instance, the data restoration module 206 may call the projector API 110 to obtain the device data from the projector memory 108. In an example, the data restoration module 206 may provide the obtained device data to the respective components and the components may be calibrated accordingly. Alternatively, the device data may be provided to the central calibration component, which may calibrate the various components of the computing system 100.

Accordingly, the device data may be written to and read from the projector memory 108 independent of the operating system being deployed by the computing system 100. Thus, in case the operating system of the computing system 100 fails, the device data may easily be restored from the projector memory 108. Therefore, once the device data is stored in the projector memory 108, the projector APIs 110 may be called to read the device data directly from the projector memory 108 and may not require the device data to be copied to data buffers in the operating system. Further, such read operations may not involve the processor 102 or caches, thereby making it convenient to recover the device data from the projector memory 108.

In an example, the projector memory 108 may be a persistent memory storage device for reliable and long term retention of the device data. The persistent memory storage device may be, for instance, at least one of an Electrically Erasable Programmable Read Only Memory (EEPROM) and a flash memory.

Figure 3:
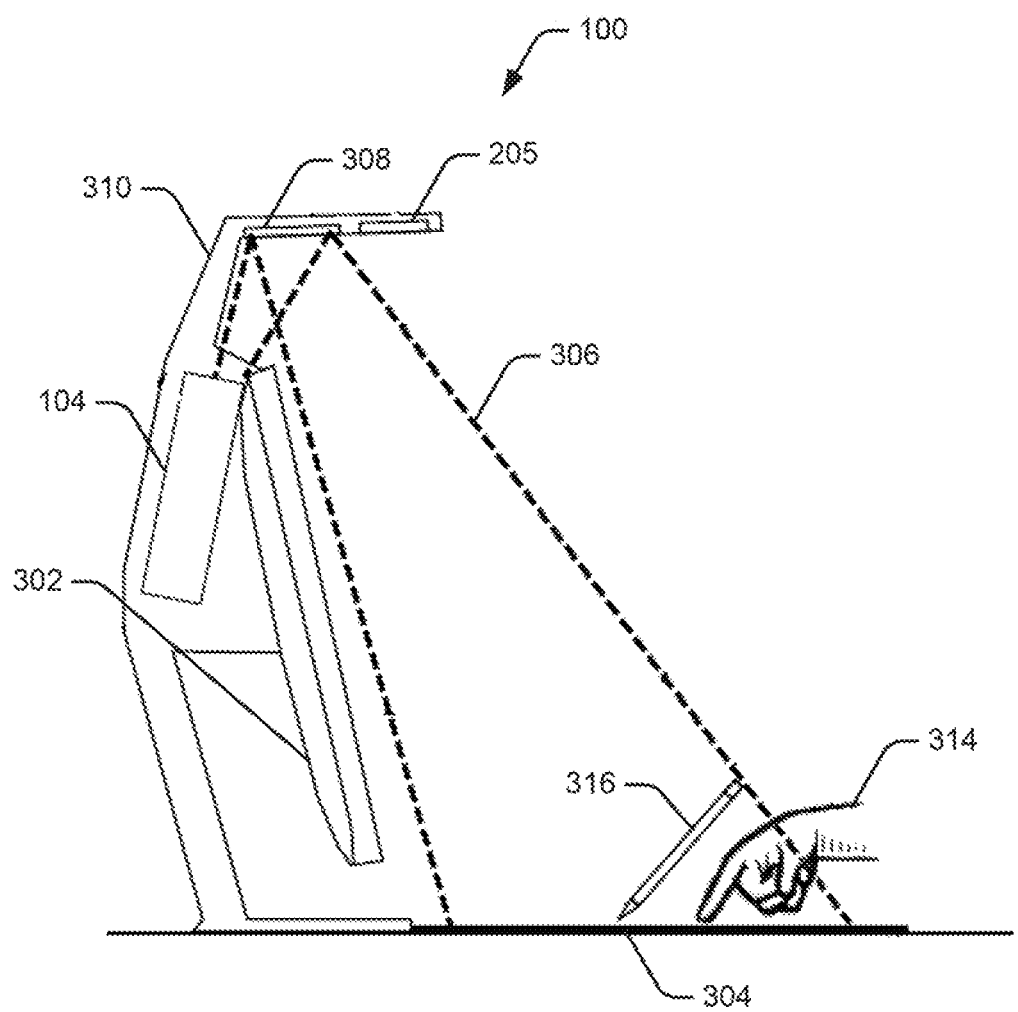
FIG. 3 illustrates an example implementation of the computing system, in accordance to an example of the present subject matter.

FIG. 3 illustrates an example implementation of the computing system 100. As illustrated, the computing system 100 includes two display units, viz., a monitor 302 and a touch mat 304. The monitor 302 may function as the display unit 106-1 and the touch mat 304 may function as the display unit 106-N. Further, the projector unit 104 may be integrated with the computing unit 210. The projector unit 104 may provide for projection of light on a display area including the touch mat 304.

The projector unit 104 may include, for example, digital light projector assembly for receiving the data and projecting an image or images corresponding to the received data. For instance, the projector unit 104 may include a digital light processing (DLP) projector or a liquid crystal on silicon (LCoS) projector. Further, the projector memory 108 (not shown in FIG. 3) may store the device data of one or more of the monitor 302, the sensor cluster unit 205, and the touch mat 304. As mentioned earlier, the projector APIs 110 may provide for storing of the device data in the projector memory 108.

In an example, the projector unit 104 may emit light 306, which may be reflected off of a mirror 308 towards the touch mat 304, thereby displaying an image on the projector display area. The mirror 306 may be provided on a support base 310 of the computing system 100. The support base 310 may also include the sensor cluster unit 205, which may function in an area overlapping and/or corresponding with projector display area.

Further, a user (not shown) may interact with the image displayed on the display area by physically engaging a touch sensitive surface of the touch mat 304. Such interaction may take place through any suitable method, such as direct interaction with a user's hand 314, through a stylus 316, or other suitable user input device(s). In an example, the image projected by the projector unit 104 on the projector display area may also be provided on the monitor 302. Alternatively, different data may be displayed on the monitor 302.

Figure 4:
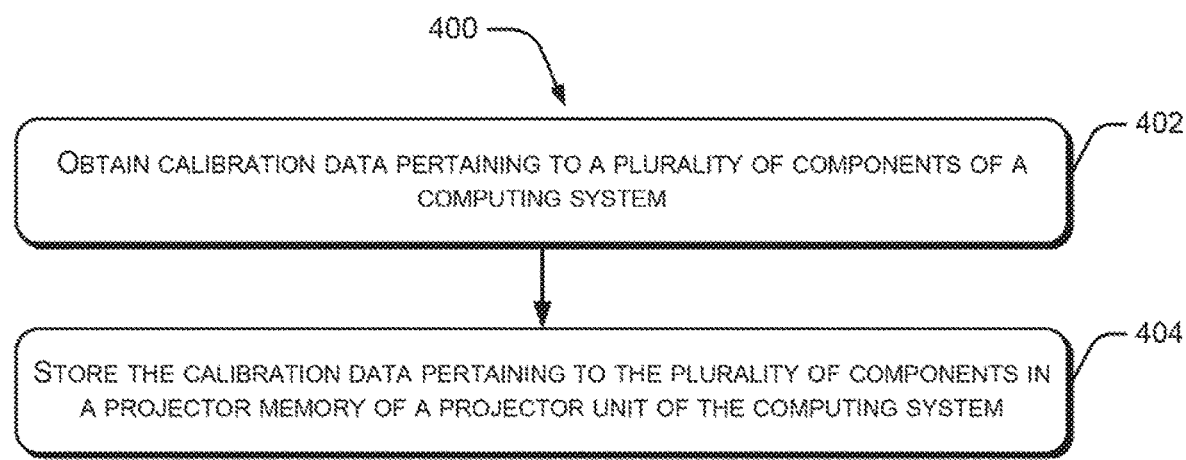
FIG. 4 illustrates an example method for device data storage, in accordance to an example of the present subject matter.
Figure 5:
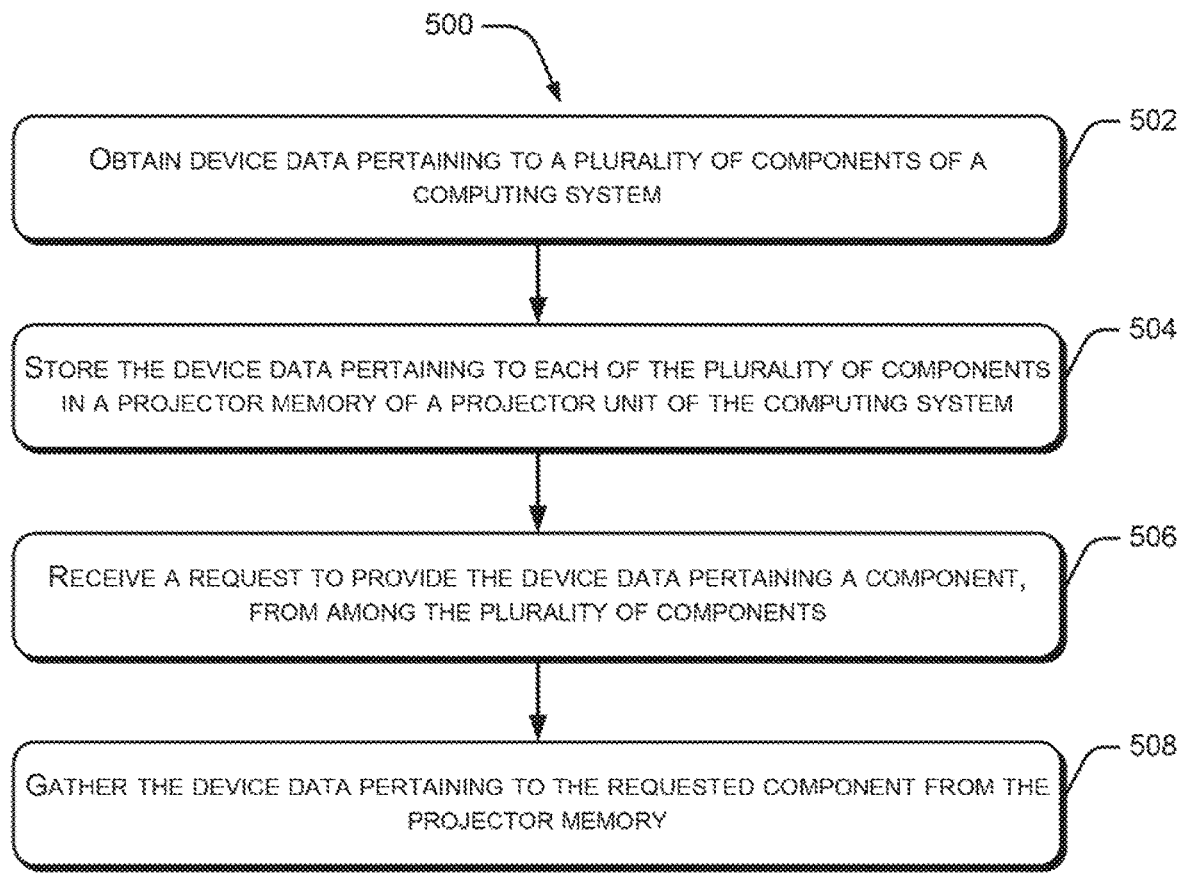
FIG. 5 illustrates another example method for device data storage, in accordance to an example of the present subject matter.

FIG. 4 and FIG. 5 illustrate example method 400 and method 500 for storing calibration data, respectively.

The order in which the methods are described is not intended to be construed as a limitation, and some of the described method blocks can be combined in a different order to implement the methods, or an equivalent alternative method. Additionally, individual blocks may be deleted from the methods without departing from the spirit and scope of the subject matter described herein. Furthermore, the methods may be implemented in any suitable hardware, computer-readable instructions, or combination thereof.

It is appreciated that the methods can be performed by programmed computing devices, for example, based on instructions retrieved from non-transitory computer readable media. The computer readable media can include machine-executable or computer-executable instructions to perform a whole or a part of the described method. The computer readable media may be, for example, digital memories, magnetic storage media, such as a magnetic disks and magnetic tapes, hard drives, or optically readable data storage media.

As depicted in FIG. 4, at block 402 calibration data pertaining to a plurality of components of a computing system, such as the computing system 100 may be obtained.

At block 404, the calibration data pertaining to the plurality of components is stored in a projector memory of a projector unit, such as the projector unit 104, of the computing system.

Referring to FIG. 5, the method 500 may be performed by a computing system, such as the computing system 100.

At block 502, device data pertaining to a plurality of components of the computing system may be obtained. The device data may include at least one of calibration data and configuration data. Further, examples of the components of the computing system include at least one display unit, a projector unit, and a sensor clustering unit including an image capturing unit. In an example, the device data may be obtained by a projector API of the projector unit.

At block 504, the device data pertaining to the plurality of components may be stored in a projector memory of the projector unit. In an example, the device data may be stored by the projector API.

At block 506, a request to provide the device data pertaining to a component, from among the plurality of components, may be received. For instance, if the default factory settings of the component are to be checked or restored, the calibration data corresponding to the component may be requested. In an example, a data restoration module, such as the data restoration module 206, of the projector unit 104 may provide the request to the projector API.

At block 508, the device data pertaining to the requested component may be gathered from the projector memory by the projector API. In an example, the gathered data may be provided to the respective component or to a central calibration component of the computing system 100.

Thus, the present subject matter provides for reliable storage and easy retrieval of calibration and configuration related data of multiple components of a computing system. Although implementations for data storage have been described in language specific to structural features and methods, it can be understood that the specific structural features and methods are disclosed as examples of systems and methods for data storage.

What is claimed is:

1. A computing system comprising:
a processor; and
a projector coupled to the processor, the projector comprising:
a projector memory; and
a projector application programming interface (API) to store calibration data pertaining to a plurality of components of the computing system in the projector memory, the plurality of components comprising the projector and a display of the computing system, wherein the calibration data comprises information pertaining to calibrations performed during factory calibration of each of the plurality of components,
the processor to detect a failure in the computing system, and in response to detecting the failure, retrieve the calibration data from the projector memory using the projector API, and restore settings of the plurality of components using the retrieved calibration data.

2. The computing system of claim 1, wherein the projector API is to further store configuration data corresponding to each of the plurality of components in the projector memory, the configuration data comprising information pertaining to device configuration of each of the plurality of components.

3. The computing system of claim 2, wherein the projector comprises data restoration instructions executable on the processor to call the projector API for obtaining device data pertaining to a component of the plurality of components, from the projector memory, the device data including at least one of the calibration data and the configuration data.

4. The computing system of claim 1, wherein the projector memory is a persistent memory device.

5. The computing system of claim 1, wherein the projector memory comprises at least one of an Electrically Erasable Programmable Read-Only Memory (EEPROM) or a flash memory.

6. The computing system of claim 1, wherein the projector API is to perform a predefined data type declaration command to allocate a memory location in the projector memory for storing the calibration data.

7. The computing system of claim 1, wherein the computing system further comprises the plurality of components, the plurality of components comprising at least one of:
a plurality of displays coupled to the processor; or
a plurality of sensors coupled to the processor.

8. A non-transitory machine-readable storage medium storing instructions that upon execution cause a system to:
detect a failure in the system; and
in response to detecting the failure:
retrieve device data stored in a projector memory, the device data pertaining to each of a plurality of displays and the projector, wherein the device data includes at least one of calibration data or configuration data, and
restore settings of the plurality of displays and the projector using the retrieved device data.

9. The non-transitory machine-readable storage medium of claim 8, wherein the projector includes a projector application programming interface (API) to perform input-output operations on the projector memory, and wherein the retrieving of the device data comprises calling the projector API to access the device data from the projector memory.

10. The non-transitory machine-readable storage medium of claim 8, wherein the device data stored in the projector memory further pertains to an image capturing unit.

11. The non-transitory machine-readable storage medium of claim 8, wherein the device data stored in the projector memory further pertains to a sensor cluster unit comprising a cluster of sensors.

12. A method comprising:
detecting, by a computing system, a failure in the computing system; and
in response to detecting the failure:
retrieving calibration data from a projector memory of a projector, the calibration data pertaining to each of a plurality of components of the computing system, the plurality of components comprising the projector and a display of the computing system, wherein the calibration data corresponds to information pertaining to calibrations performed during factory calibration of each of the plurality of components, and restoring, using the calibration data retrieved from the projector memory, the plurality of components.

13. The method of claim 12, further comprising:
retrieving, from the projector memory, configuration data pertaining to each of the plurality of components, the configuration data comprising information pertaining to device configuration of each of the plurality of components; and
configuring, using the configuration data retrieved from the projector memory, the plurality of components.

14. The computing system of claim 1, wherein the detected failure is a failure of an operating system of the computing system, and wherein the retrieving of the calibration data and the restoring of the settings are performed responsive to detecting the failure of the operating system.

15. The computing system of claim 1, wherein the detected failure is a failure of a component of the computing system, and wherein the retrieving of the calibration data and the restoring of the settings are performed responsive to detecting the failure of the component.

16. The computing system of claim 1, wherein the detected failure is a loss of device data of a component of the computing system, and wherein the retrieving of the calibration data and the restoring of the settings are performed responsive to detecting the loss of the device data of the component.

17. The non-transitory machine-readable storage medium of claim 8, wherein the detected failure comprises a failure of an operating system or a failure of a component in the system.

18. The non-transitory machine-readable storage medium of claim 8, wherein the detected failure comprises a loss of device data of a component in the system.

19. The method of claim 12, wherein retrieving the calibration data from the projector memory comprises calling a projector application programming interface (API) of the projector.

20. The method of claim 12, wherein the detected failure comprises a failure of an operating system or a failure of a component in the system.

21. The method of claim 12, wherein the detected failure comprises a loss of device data of a component in the system.

* * * * *